United States Patent Office 3,117,151
Patented Jan. 7, 1964

3,117,151
O-(2,2-DICHLORO-1-CYANOVINYL)O,O-DIETHYL PHOSPHATE
Etcyl H. Blair, Midland, Mich., assignor to The Dow Chemical Company, Midland, Mich., a corporation of Delaware
No Drawing. Filed Oct. 30, 1961, Ser. No. 148,731
1 Claim. (Cl. 260—461)

The present invention is directed to phosphoric acid esters and methods of producing the same. The phosphoric acid esters are characterized by the following formula

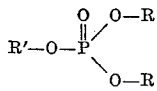

In this and succeeding formulae, each R represents loweralkyl and R' represents 1-cyanoalkyl, 1-cyano - 2 - methylallyl, 1-cyano-2,2-dihalovinyl, 1-cyano-loweralkyl and halo-1-cyano-loweralkyl. In the present specification and claims, the expression "loweralkyl" is employed to refer to the alkyl radicals containing up to 5 carbon atoms. The compounds are liquid materials which are somewhat soluble in many common organic solvents and of low solubility in water. They are useful as parasiticides and herbicides and adapted to be employed as active toxic constituents of compositions for the control of many parasite species such as mites, insects, worms, beetles, aphids, flies, roaches and broad leafed plants.

The new compounds can be prepared by reacting an O,O-dialkyl phosphorochloridate with cyanohydrin having the formula

wherein X represents 1-cyanoallyl, 1-cyano-2-methylallyl, 1-cyano-loweralkyl or halo-1-cyano-loweralkyl. Representative cyanohydrins include the 2-hydroxy alkanenitriles and 2-hydroxy-haloalkanenitriles, such as 2-hydroxy-acetonitrile, 2-hydroxy-propionitrile, 2-hydroxybutyronitrile, 2-hydroxy-pentanenitrile, 2-hydroxy-3,3-dichloropropionitrile, 2-hydroxy - 3,4 - dibromobutyronitrile, 2-hydroxy - 3,3 - dichlorobutyronitrile, 2-hydroxy-3,3-dichloropentanenitrile, 2-hydroxy - 3,3,4 - trichlorobutanenitrile and 4-methyl - 2 - hydroxy-3,3-dichloropentanenitrile. The reaction is carried out in the presence of an alkaline agent such as an alkali metal hydroxide, alkali metal carbonate or a tertiary amine and conveniently in the presence of an organic liquid as reaction medium. Good results are obtained when employing about one molecular proportion of each of the phosphorochloridate and cyanohydrin reagents with one or more molecular proportions of the alkaline agent. The reaction is somewhat exothermic and takes place smoothly at temperatures at which chloride of reaction is evolved. The chloride appears in the reaction mixture as alkali metal chloride or the hydrochloride salt of the tertiary amine, depending upon the alkaline agent employed. The temperature may be controlled by regulating the rate of contacting the reactants and by external cooling. Good results are obtained when operating at temperatures of from —5° to 55° C. When employing the phosphorochloridate and 3,3,3-trihalo-2-hydroxy-propionitrile together with a tertiary amine as the alkaline agent, an esterification and dehydrohalogenation is effected whereby the O-(2,2-dihalo-1-cyanovinyl) O,O-dialkyl phosphate compounds are prepared. In such embodiment, it is preferred to employ about 2 molecular proportions of the tertiary amine with one molecular proportion of each of the phosphorochloridate and 3,3,3-trihalo - 2 - hydroxypropionitrile. Employing these same reagents with an alkali metal hydroxide or alkali metal carbonate as alkaline agent results in the production of the O-(2,2,2-trihalo-1-cyanoethyl) O,O-dialkyl phosphates. Upon completion of the reaction, the desired product is separated and purified by conventional procedures.

In carrying out the reaction, the reactants are mixed and brought together in any convenient fashion and the mixture maintained for a period of time in the contacting temperature range to effect the completion of the reaction. In a convenient mode of operation, the phosphorochloridate is mixed with the cyanohydrin and the alkaline agent added portionwise thereto with stirring at a temperature of from —5 to 55° C. In an alternative procedure, the alkaline agent is admixed with one of the phosphorochloridate or cyanohydrin and the remaining reagent contacted with the mixture in the contacting temperature range. Suitable alkaline agents include sodium hydroxide, sodium carbonate, potassium hydroxide, triethylamine, diethyl propylamine, tripropylamine, pyridine, etc. Following the mixing of the reagents and alkaline agent, the reaction mixture is maintained for a period of time in the reaction temperature range to insure completion of the reaction. Following the reaction, the reaction mixture can be filtered to separate alkaline metal chloride or tertiary amine hydrochloride and the residue thereafter fractionally distilled under reduced pressure to separate the desired product.

The following examples merely illustrate the present invention and are not to be construed as limiting.

Example 1

O-(1-CYANOETHYL) O,O-DIETHYL PHOSPHATE

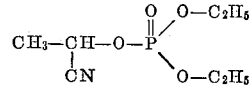

O,O-Diethyl phosphorochloridate (98 grams; 0.5 mole) is mixed with 40 grams (0.563 mole) of 2-hydroxypropionitrile dispersed in 100 milliliters of benzene and 41 grams (0.518 mole) of pyridine dissolved in 50 milliliters of benzene added portionwise thereto with stirring and cooling. The addition is carried out over a period of 40 minutes and at a temperature of from 5° to 10° C. Stirring is thereafter continued for four hours as the mixture is allowed to come to room temperature to complete the reaction. The reaction mixture is thereafter diluted with benzene, the diluted product successively washed with water and the washed product fractionally distilled under reduced pressure to obtain an O-(1-cyanethyl) O,O-diethyl phosphate product having a density of 1.094 at 25° C. and a refractive index n/D of 1.4113 at 25° C.

Example 2

O-(2,2-DICHLORO-1-CYANOVINYL) O,O-DIETHYL PHOSPHATE

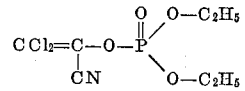

O,O-Diethyl phosphorochloridate (17.2 grams; 0.1 mole) dispersed in 50 milliliters of benzene is mixed with 17.4 grams (0.1 mole) of 2-hydroxy-3,3,3-trichloropropionitrile dispersed in about 180 milliliters of benzene and 16 grams (0.202 mole) of pyridine added portionwise to said mixture. The addition is carried out with stirring and at a temperature of 5° C. Stirring is thereafter continued and the reaction mixture allowed to come to room temperature and thereafter set aside for 16 hours. The reaction mixture is thereafter filtered, the filtrate successively washed with water and the washed product fractionally distilled under reduced pressure to obtain an O-(2,2-dichloro-1-cyanovinyl) O,O-diethyl phosphate product boiling at 150° at 14 millimeters pressure and having a chlorine content of 24.9 percent as compared to a theoretical content of 24.4 percent.

*Example 3*

O-(1-CYANO-2-METHALLYL) O,O-DIETHYL PHOSPHATE

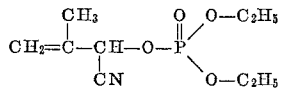

O,O-Diethyl phosphorochloridate 86.3 grams (0.5 mole) is mixed with 48.6 grams (0.5 mole) of 3-methyl-2-hydroxy-3-butenenitrile dispersed in 100 milliliters of benzene and 49.4 grams (0.63 moles) of pyridine added portionwise thereto with stirring and cooling. The addition is carried out over a period of 30 minutes and at a temperature of 12° C. Stirring is thereafter continued and the reaction mixture allowed to warm to room temperature and maintained thereat for 8 hours to complete the reaction. The reaction mixture is thereafter diluted with 100 milliliters of benzene and the diluted mixture successively washed with water and aqueous 2 percent sodium carbonate. Following the washing, the washed mixture is fractionally distilled under reduced pressure to obtained an O-(1-cyano-2-methylallyl) O,O-diethyl phosphate product as a liquid material having a density of 1.101 at 25° C., a refractive index of 1.4329 at 25° C., and a nitrogen content of 5.78 percent as compared to a nitrogen theoretical content of 6.0 percent.

*Example 4*

O-(2,2,2-TRICHLORO-1-CYANOETHYL) O,O-DIMETHYL PHOSPHATE

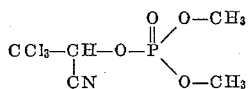

O,O-dimethyl phosphorochloridate (72 grams; 0.5 mole) is mixed with 87 grams (0.5 mole) of 2-hydroxy-3,3,3-trichloropropionitrite dispersed in 200 milliliters of benzene and 20 grams (0.5 mole) of sodium hydroxide dispersed in 100 milliliters of benzene added portionwise thereto with stirring. The addition is carried out over a period of one hour and at a temperature of from 5° to 15° C. Stirring is thereafter continued for 4 hours as the mixture is allowed to come to room temperature to complete the reaction. The reaction mixture is thereafter filtered and the filtrate distilled under reduced pressure to obtain an O-(2,2,2-trichloro-1-cyanoethyl) O,O-dimethyl phosphate product having chlorine, carbon and nitrogen contents of 37, 24 and 5 percent, respectively.

In a similar manner, other products of the present invention are prepared as follows:

O-(1-cyanoallyl) O,O-dimethyl phosphate (carbon content of 37 percent; nitrogen content of 7.3 percent) by reacting together O,O-dimethyl phosphorochloridate, 2-hydroxy-3-butenenitrile and triethylamine.

O-(2,2-dichloro-1-cyanoethyl) O,O-dimethyl phosphate (molecular weight of 247; nitrogen content of 5.6 percent) by reacting together O,O-dimethyl phosphorochloridate, 3,3-dichloro-2-hydroxy-propionitrile and potassium hydroxide.

O-(1-cyanobutyl) O,O-dibutyl phosphate (molecular weight of 289; carbon content of 54 percent) by reacting together O,O-dibutyl phosphorochloridate, 2-hydroxy-pentanenitrile and diethyl propylamine.

O-(2,2-dichloro-1-cyanobutyl) O,O-dimethyl phosphate (carbon content of 30 percent; nitrogen content of 5 percent) by reacting together O,O-dimethyl phosphorochloridate, 3,3-dichloro-2-hydroxy-pentanenitrile and sodium hydroxide.

O-(2,3-dibromo-1-cyanobutyl) O,O-diethyl phosphate (carbon content of 27 percent; bromine content of 40 percent) by reacting together O,O-diethyl phosphorochloridate, 3,4-dibromo-2-hydroxy-pentanenitrile and pyridine.

O-(2,2,3-trichloro-1-cyanopropyl) O-methyl O-ethyl phosphate (phosphorus content of 10 percent; chlorine content of 34 percent) by reacting together O-methyl O-ethyl phosphorochloridate, 3,3,4-trichloro-2-hydroxy-butyronitrile and sodium carbonate.

O-(2-chloro-1-cyanoethyl) O,O-dimethyl phosphate (molecular weight of 212; chlorine content of 16.1 percent) by reacting together O,O-dimethyl phosphorochloridate, 3-chloro-2-hydroxypropionitrile and pyridine.

The new compounds of the present invention are useful as herbicides and parasiticides for the control of a number of plant and parasite species. For such use, the products are dispersed on a finely divided solid and employed as dusts. Also, such mixture may be dispersed in water with or without the aid of a surface active dispersing agent and the resulting aqueous suspensions employed as sprays. In other procedures, the products are employed as toxic constituents in solvent solutions, oil-in-water or water-in-oil emulsions or aqueous dispersions. In representative operataions, aqueous compositions containing 3,000 parts per million by weight of O-(1-cyanoethyl) O,O-diethyl phosphate, O-(1-cyanoethyl) O,O-dimethyl phosphate and O-(2,2-dichloro-1-cyanovinyl) O,O-diethyl phosphate give complete kills of two-spotted spider mites.

The cyanohydrins employed as starting materials in accordance with the present teachings are prepared in accordance with known procedures wherein a suitable aldehyde is reacted with hydrogen cyanide. Preferred cyanohydrins employed in accordance with the present invention include those obtained from the haloalkanoic acid aldehydes wherein halogen is substituted on the 2- and 3-positions such as the haloacetaldehydes, 2,2-dihaloalkanoic acid aldehydes, 2,3-dihaloalkanoic acid aldehydes and 2,2,3-trihaloalkanoic acid aldehydes.

I claim:

O-(2,2-dichloro-1-cyanovinyl) O,O-diethyl phosphate.

References Cited in the file of this patent

UNITED STATES PATENTS

| | | |
|---|---|---|
| 2,494,283 | Cassaday et al. | Jan. 10, 1950 |
| 2,494,284 | Cassaday et al. | Jan. 10, 1950 |
| 2,611,728 | Bartlett | Sept. 23, 1952 |
| 2,957,019 | McCall et al. | Oct. 18, 1960 |
| 2,965,533 | Whetstone | Dec. 20, 1960 |

OTHER REFERENCES

Hall et al.: "J. Am. Chem. Soc." vol. 79, pp. 1768–1769 (1957).